（12）United States Patent
Fukuzawa et al.

(10) Patent No.: US 8,867,429 B2
(45) Date of Patent: Oct. 21, 2014

(54) WIRELESS COMMUNICATION SYSTEM, WIRELESS COMMUNICATION METHOD THEREOF, REPEATER DEVICES AND WIRELESS TERMINAL DEVICES

(75) Inventors: Shoji Fukuzawa, Osaka (JP); Yoshiyuki Tanaka, Osaka (JP)

(73) Assignee: Icom Incorporated (JP)

( * ) Notice: Subject to any disclaimer, the term of this patent is extended or adjusted under 35 U.S.C. 154(b) by 650 days.

(21) Appl. No.: 13/121,947

(22) PCT Filed: Oct. 28, 2009

(86) PCT No.: PCT/JP2009/068532
§ 371 (c)(1),
(2), (4) Date: Mar. 30, 2011

(87) PCT Pub. No.: WO2010/050529
PCT Pub. Date: May 6, 2010

(65) Prior Publication Data
US 2011/0199959 A1    Aug. 18, 2011

(30) Foreign Application Priority Data

Oct. 28, 2008  (JP) ................................. 2008-277519

(51) Int. Cl.
*H04B 7/14* (2006.01)
*H04W 48/20* (2009.01)
*H04W 72/04* (2009.01)
*H04W 88/08* (2009.01)
*H04B 7/26* (2006.01)
*H04W 48/08* (2009.01)

(52) U.S. Cl.
CPC .......... *H04W 48/20* (2013.01); *H04W 72/0493* (2013.01); *H04W 88/08* (2013.01); *H04B 7/2606* (2013.01); *H04W 48/08* (2013.01)

USPC ........... 370/315; 370/226; 370/221; 370/338; 370/216; 370/222; 455/11.1; 455/7; 455/9

(58) Field of Classification Search
CPC ....... H04B 7/2606; H04B 1/74; H04W 88/04; H04W 88/06; H04W 28/04; H04W 72/04
USPC ......... 370/315, 338, 328, 329, 254, 216, 217, 370/218, 221, 226; 455/11.1, 7, 9
See application file for complete search history.

(56) References Cited

U.S. PATENT DOCUMENTS 7,684,337 B2 * 3/2010 Mehta et al. .................. 370/238
2002/0098836 A1 * 7/2002 Han et al. ...................... 455/423

FOREIGN PATENT DOCUMENTS

| AU | 2012244209 | 11/2012 |
|---|---|---|
| CN | 1204933 | 1/1999 |

(Continued)

OTHER PUBLICATIONS

Notification of First Office Action issued in corresponding Chinese Patent Application No. 200980143304.0 on Apr. 24, 2013.

*Primary Examiner* — Jamal Javaid
(74) *Attorney, Agent, or Firm* — Baker & McKenzie LLP

(57) ABSTRACT

Plural repeaters ($111_1$ to $111_n$) are connected one another via a system bus (115), and each of which detects the state of another repeater by checking a signal transmitted over the system bus (115). When stopping the operation of home repeater (e.g., the repeater ($111_1$)) which performs relaying process among wireless terminal devices (TA) to (TH), a secondary repeater (e.g., the repeater ($111_2$)) set beforehand detects that the home repeater breaks down as the secondary repeater becomes unable to detect the signal over the system bus (115). The secondary repeater responds to the detection and bears the relaying process instead of the home repeater.

4 Claims, 8 Drawing Sheets

(56) References Cited

FOREIGN PATENT DOCUMENTS

| | | |
|---|---|---|
| CN | 1311567 | 9/2001 |
| JP | 04-504342 | 7/1992 |
| JP | 2000-102056 | 4/2000 |
| JP | 2007-295133 | 11/2007 |
| JP | 2007-295134 | 11/2007 |
| WO | WO2006-088082 | 8/2006 |

* cited by examiner

WIRELESS COMMUNICATION SYSTEM, WIRELESS COMMUNICATION METHOD THEREOF, REPEATER DEVICES AND WIRELESS TERMINAL DEVICES

RELATED APPLICATION

This application is based on Japanese Patent Application No. 2008-277519 filed on Oct. 28, 2008. The specification, claims, and drawings of this Japanese application are entirely incorporated herein by reference in this specification.

TECHNICAL FIELD

The present invention relates to a wireless communication system, a wireless communication method thereof, a relay device and a wireless terminal device.

BACKGROUND ART

Communication traffic relayed by a relay device like a repeater increases with significant increase of the number of wireless terminal devices. Accordingly, there is proposed a distributed wireless communication system which allows a wireless terminal device to select at least one relay device among plural relay devices which are connected one another via a predetermined communication line when the wireless terminal device communicates with another wireless terminal device. In such wireless communication system, each wireless terminal device calls through a channel of a repeater to establish a communication path with a communication-counterparty wireless terminal device. The repeater notifies information indicating whether or not the current channel is busy or idle to wireless terminal devices in an area through a communication frame which is a unit of radio signal.

According to patent literature 1, a wireless communication system includes plural pieces of transceiver means for exchanging a wireless communication across equal to or more than one channel and plural pieces of repeater means each for establishing a wireless communication with equal to or more than one piece of transceiver means. A wireless communication is completed by an information signal (voice or data information) and by a control signal (control information transmitted in accordance with a signaling protocol). As the control signal which is transmitted in a sub-audio band simultaneously with transmission of the information signal from a channel is relayed and transmitted, a wireless communication is carried out between the transceiver means and the repeater means.

Each transceiver means is programmed together with two channel numbers: one is for home repeater means and another is for second home repeater means. When the power is turned on, the transceiver means scans both home channel and second home channel to determine whether or not to monitor it. When an effective control message is detected in either of the channels, the channel where the effective control message is detected becomes a monitor channel. In this case, the chance of the home channel becoming the monitor channel and that of the second home channel becoming the monitor channel are equal. Unless no effective control message is detected in the monitor channel or unless a system which is programmed with a different site number is selected, the monitor channel remains unchanged.

Patent Literature 1: Japanese National Publication No. H4-504342

According to patent literature 1, because a control signal is transmitted across both home channel and second home channel and the chance of the home channel becoming the monitor channel and that of the second home channel becoming the monitor channel are equal, a configuration is not accomplished in which either one of the channels supports another channel.

In addition to the wireless communication system disclosed in patent literature 1, according to conventional distributed wireless communication methods and wireless communication systems which allow a wireless terminal device to select a repeater having an idle channel that is currently able to relay a communication among plural repeaters when wireless terminal devices communicate with each other, unlike a wireless communication system with an dedicated control channel independently from a communication channel, as each repeater bears an equal role, a configuration is not accomplished in which a repeater bears a relaying process instead of another repeater when a situation causing another repeater currently performing relaying process to terminate that relaying process occurs. Moreover, like patent literature 1, the situation causing the relaying process to be terminated is not limited to a case in which no effective control message is detected.

As explained above, the conventional distributed wireless communication system has relatively low fault tolerance.

The present invention has been made in order to overcome the foregoing problem, and it is an object of the present invention to provide a wireless communication system which has high fault tolerance and which includes plural relay devices, a wireless communication method thereof, a relay device and a wireless terminal device.

Moreover, it is another object of the present invention to provide a wireless communication system which enables a relay device to bear a relaying process instead of another relay device when a situation causing another relay device currently performing relaying process to terminate its operation occurs, a wireless communication method thereof, the relay device and a wireless terminal device.

Means for Solving the Problem

To achieve the foregoing objects, a wireless communication system according to a first aspect of the present invention is a wireless communication system which comprises a plurality of relay devices which are connected one another via a communication line and to which unique relaying channels are respectively allocated; and a plurality of wireless terminal devices which communicate with each other via the relay device, in which each relay device transmits control information to the wireless terminal device which is registered in own relay device, and in which each wireless terminal device selects, based on the control information received from the relay device which registers own wireless terminal device, a channel that is currently able to relay a communication among channels allocated to the respective relay devices to establish a communication between the wireless terminal devices, wherein when a first relay device becomes unable to transmit the control information, a second relay device transmits, instead of the first relay device, the control information to the wireless terminal device registered in the first relay device, and the wireless terminal device registered in the first relay device receives the control information from the second relay device.

When being unable to receive a signal regularly transmitted from the first relay device via the communication line even after a predetermined period has elapsed, the second relay device may transmit, instead of the first relay device, the control information to the wireless terminal device registered in the first relay device.

When being unable to receive control information from the first relay device even after a predetermined period has elapsed, the wireless terminal device registered in the first relay device may receive the control information from the second relay device.

The second relay device may have information on the wireless terminal device registered in the first relay device beforehand, and the wireless terminal device registered in the first relay device may have information on the second relay device beforehand.

A wireless communication method of a wireless communication system according to a second aspect of the present invention is a wireless communication method of a wireless communication system which comprises a plurality of relay devices which are connected one another via a communication line and to which unique relaying channels are respectively allocated, and a plurality of wireless terminal devices which communicate with each other via the relay device, in which each relay device transmits control information to the wireless terminal device registered in own relay device, and in which each wireless terminal device selects, based on the control information received from the relay device which registers own wireless terminal device, a channel that is currently able to relay a communication among channels allocated to the respective relay devices to establish a communication between the wireless terminal devices, wherein when a first relay device becomes unable to transmit the control information, a second relay device transmits, instead of the first relay device, the control information to the wireless terminal device registered in the first relay device, and the wireless terminal device registered in the first relay device receives the control information from the second relay device.

A relay device according to a third aspect of the present invention to which each unique relaying channel is allocated, and which is connected to another relay device via a communication line, transmits control information to a wireless terminal device registered in own relay device, and relays communication information from a wireless terminal device includes a memory unit which stores identification information of a wireless terminal device registered in another relay device; and a transmitting unit which transmits the control information to the wireless terminal device registered in another relay device based on the identification information stored in the memory unit when the control information is not transmitted from another relay device, wherein the relay device transmits, instead of another relay device, the control information to the wireless terminal device registered in another relay device.

A wireless terminal device according to a fourth aspect of the present invention selects, based on the control information received from a relay device that registers own wireless terminal device, a channel that is currently able to relay a communication among channels allocated to respective relay devices to communicate with a communication counterparty via the relay device, and includes a memory unit which stores channel information on a first relay device and channel information on a second relay device with the relay device registering own wireless terminal device being as the first relay device and with a relay device having the channel that is currently able to relay the communication being as the second relay device; and a communication unit which changes a channel based on the channel information on the second relay device stored in the memory unit and which receives the control information from the second relay device when no control information is received from the first relay device within a time set beforehand.

Effect of the Invention

According to the present invention, it is possible for a relay device to bear a relaying process instead of another relay device when a situation causing another relay device currently performing relaying process to terminate its operation occurs. Consequently, high fault tolerance can be accomplished.

BEST MODE FOR CARRYING OUT THE INVENTION

An explanation will be given of an embodiment of a wireless communication system, a wireless communication method, a relay device and a wireless terminal device according to the present invention with reference to the accompanying drawings.

Figure 1:
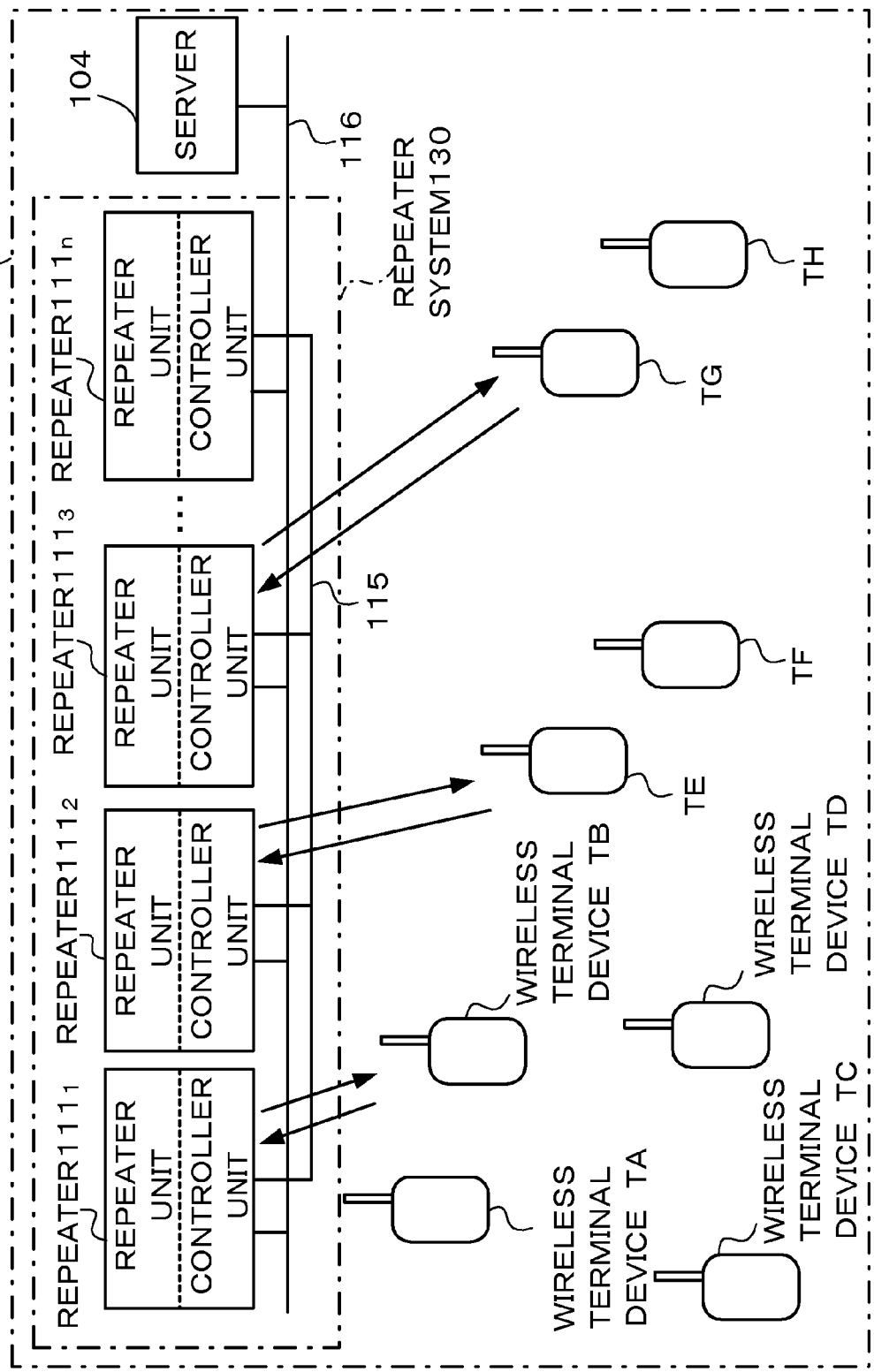
FIG. 1 is a diagram showing a configuration of a wireless communication system according to an embodiment of the present invention.

As shown in FIG. 1, a site 100 of the wireless communication system of the present embodiment includes plural (e.g., thirty units at maximum) repeaters $111_1$ to $111_n$, connected one another via a communication line 115. Unique relaying channels are respectively allocated to the plural repeaters $111_1$ to $111_n$, and those repeaters bear a relaying process in the same communication area. The plural repeaters $111_1$ to $111_n$ connected one another via the communication line 115 configures a repeater system (a relay system) 130. That is, the repeater system 130 configures a communication area with n number of channels (where n is the number of repeaters). Moreover, the repeater system 130 including the plural repeaters $111_1$ to $111_n$ is connected to a server 104 via a communication line 116 like an IP connection line. In general, the communication line 115 is called a "system bus", the communication line 115 is referred to as the system bus in the following explanation.

The server 104 can perform various settings of the plural repeaters $111_1$ to $111_n$ through a remote operation. The repeaters $111_1$ to $111_n$ each includes a repeater unit and a controller unit. Moreover, information on the respective repeaters $111_1$ to $111_n$ (e.g., whether or not such repeaters are relaying a communication) is exchanged and shared via the system bus 115. At which time slot data is to be transmitted is set for each of the repeaters $111_1$ to $111_n$ beforehand. Accordingly, the repeaters $111_1$ to $111_n$ each transmits data at a time slot set beforehand.

One repeater among the plural repeaters $111_i$ to $111_n$ is set as a "master repeater". An explanation will now be given of a case in which the repeater $111_1$ is the master repeater among the repeaters $111_1$ to $111_n$. The master repeater transmits a synchronization signal to the system bus for establishing a synchronization with the repeaters $111_1$ to $111_n$ including the master repeater itself.

Wireless terminal devices TA to TH each registers any one repeater among the repeaters $111_1$ to $111_n$ as a home repeater. The wireless terminal devices TA to TH each receives a downlink signal of the home repeater in a standby mode. The wireless terminal devices TA to TH each acquires idle channel information inserted in the downlink signal of the home repeater, and shifts a channel frequency to the channel frequency of that idle channel to communicate with another wireless terminal device. After the communication ends, the wireless terminal device returns the channel frequency to the channel frequency of the home repeater and returns to the standby mode. In FIG. 1, the wireless terminal devices TA to TD register the repeater $111_1$ as a home repeater, the wireless terminal devices TE and TF register the repeater $111_2$ as a home repeater, and the wireless terminal devices TG and TH register the repeater $111_3$ as a home repeater.

The wireless communication system in FIG. 1 is a distributed trunking system in which the wireless terminal devices TA to TH share the plural repeaters $111_1$ to $111_n$ and select at least one repeater as needed for relaying among those repeaters. The distributed trunking system has no dedicated control channel, and all channels serve not only as control channels, but also as communication channels. For example, it is presumed that the wireless terminal device TA communicates with the other wireless terminal devices TB to TD which are registered in the same home repeater. In this case, the wireless terminal device TA acquires channel information which is included in a downlink signal from the repeater $111_1$ that is the home repeater of the wireless terminal device TA and which indicates channels enabling a communication, determines the channels enabling a communication based on the acquired channel information, selects one of the determined channels enabling a communication (e.g., the channel of the repeater $111_3$), and shifts the channel frequency to that of the selected channel.

Moreover, the wireless terminal device TA transmits a request for communication permission to that channel (the repeater $111_3$), receives a response to the effect that a communication is permitted from the repeater $111_3$ providing that channel, and establishes a link. The wireless terminal devices TB to TD that are communication counterparties each receiving a control signal which is transmitted from the home repeater $111_1$ and which instructs shifting to a communication channel (the channel of the repeater $111_3$) where the wireless terminal device TA has established the link change respective channel frequencies to a channel frequency for the instructed channel to communicate with the wireless terminal device TA. That is, the repeater $111_1$ operates as a control channel for the wireless terminal devices TA to TD which register the repeater $111_1$ as the home repeater, and operates as a communication channel for the other wireless terminal devices TE to TH. Examples of a communication among the wireless terminal devices TA to TD are a group communication across the whole wireless terminal devices TA to TD, and with the unit of such group being further divided, a group communication in a small group defined by, for example, the wireless terminal devices TA and TB, or an individual calling (referred to as an "Individual Call") with a wireless terminal device being targeted.

Figure 2:
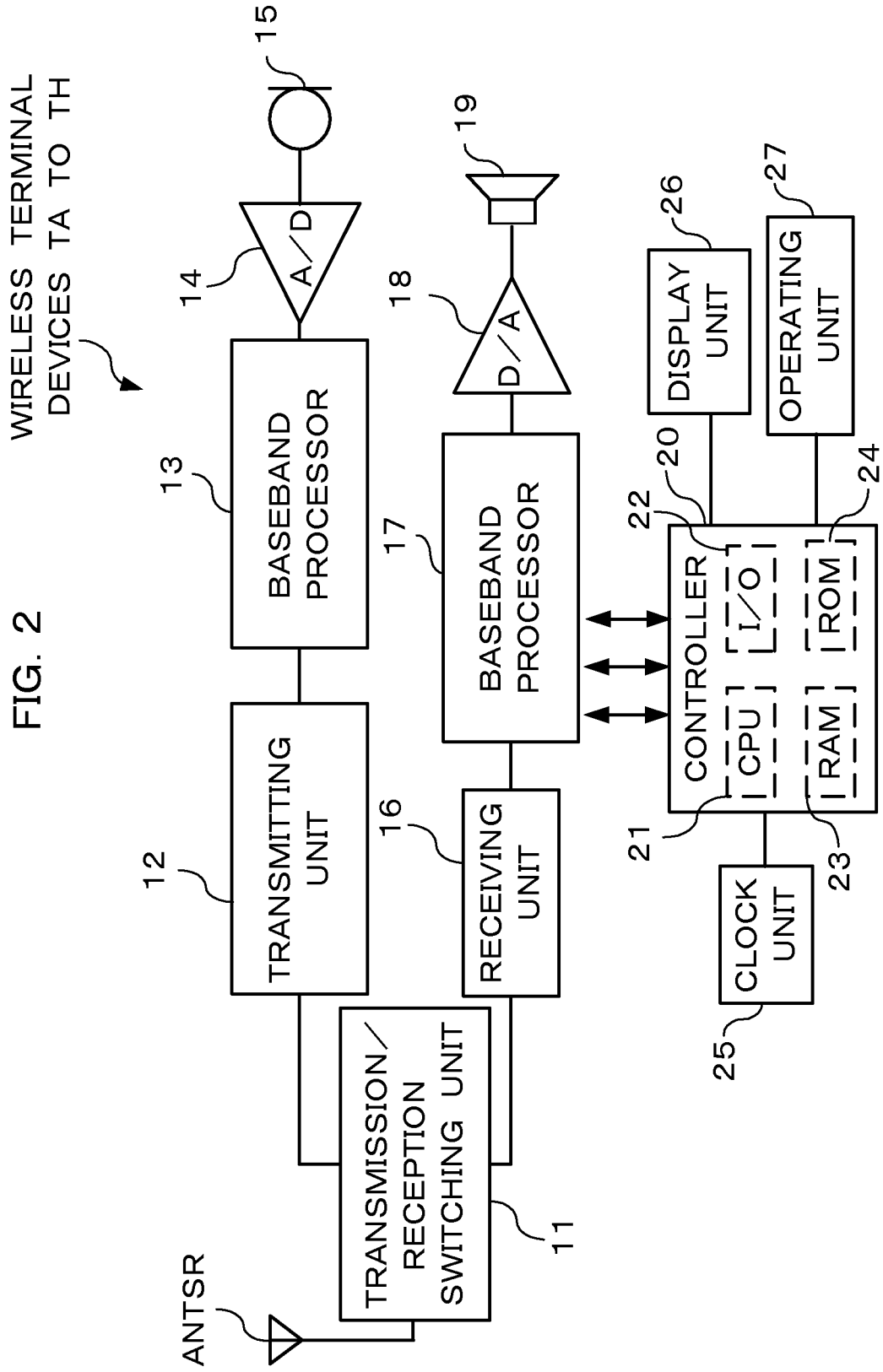
FIG. 2 is a block diagram showing a configuration of a wireless terminal device in FIG. 1.
Figure 3:
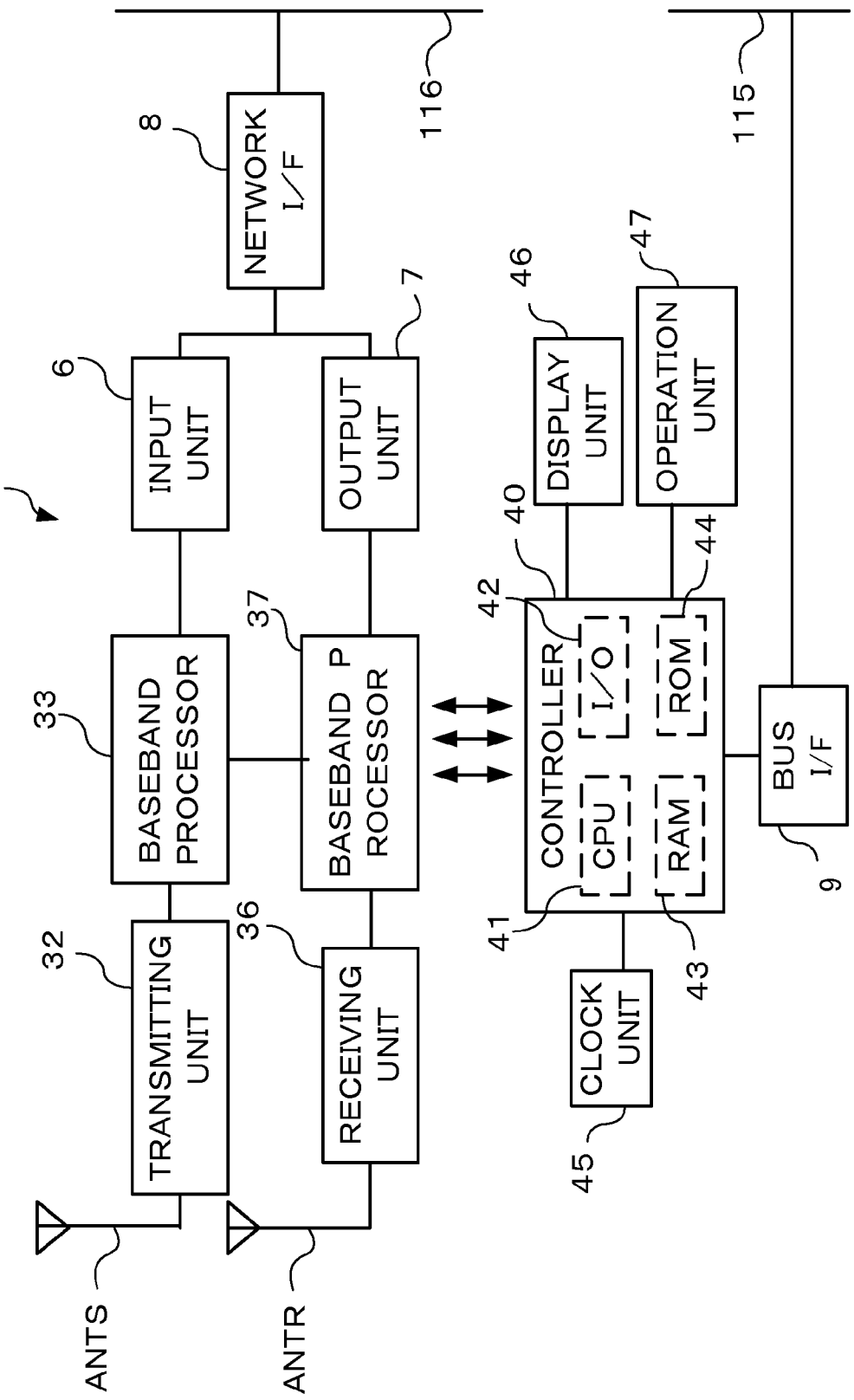
FIG. 3 is a block diagram showing a configuration of a repeater in FIG. 1.
Figure 4:
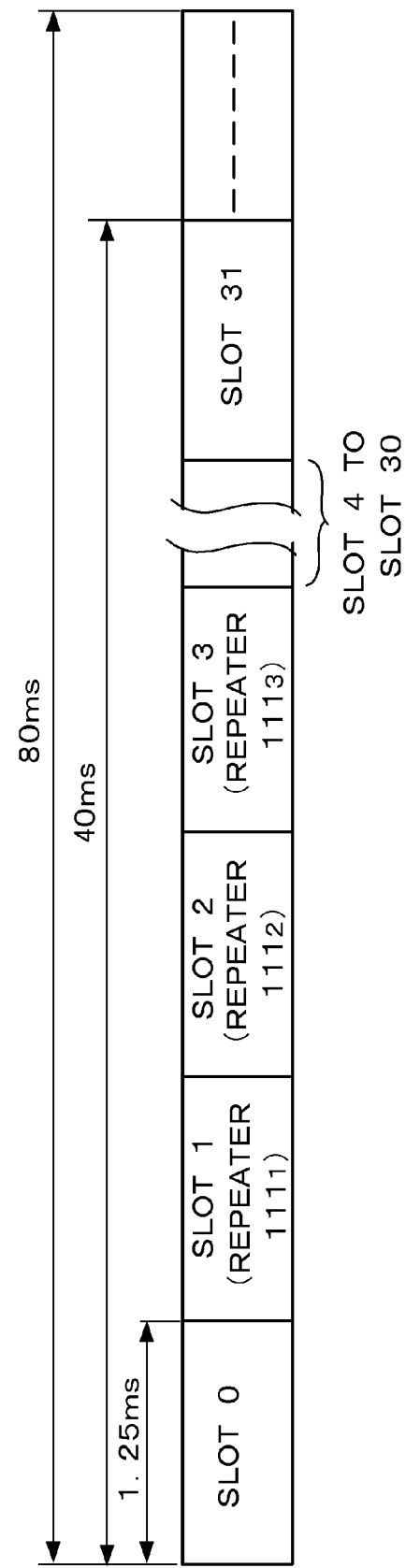
FIG. 4 is a diagram showing a synchronization signal transmitted to a system bus by a master repeater and a SLOT which follows the synchronization signal and which corresponds to each repeater.

Next, with respect to the wireless terminal devices TA to TH and the repeaters $111_1$ to $111_n$, an explanation will be given of a configuration and a function. FIG. 2 is a block diagram showing a configuration of each of the wireless terminal devices TA to TH in FIG. 1. FIG. 3 is a block diagram showing a configuration of each of the repeaters $111_1$ to $111_n$ in FIG. 1. FIG. 4 is a diagram showing a synchronization signal transmitted to the system bus 115 from the master repeater $111_1$, and a time slot which follows the synchronization signal and which is allocated to each repeater. FIGS. 5A and 5B are diagrams each showing a format of a communication frame exchanged between the repeater and the wireless terminal device. The communication frame includes a header part and a data part. Contents of the header part and those of the data part will be discussed later in detail.

As shown in FIG. 2, as blocks for a signaling system, the wireless terminal devices TA to TH each includes an antenna ANTSR, a transmission/reception switching unit 11, a transmitting unit 12, a baseband processor 13, an A/D converter 14, a microphone 15, a receiving unit 16, a baseband processor 17, a D/A converter 18, and a speaker 19. Moreover, as blocks for a control system, the wireless terminal devices TA to TH each includes a controller 20, a clock unit 25, a display unit 26, and an operating unit 27. Furthermore, the controller 20 has a CPU (central processing unit) 21, an I/O (input/output unit) 22, a RAM (random access memory) 23, a ROM (read-only memory) 24, and an internal bus (not illustrated) which connects those together.

The blocks for the signaling system of each of the wireless terminal devices TA to TH are controlled by the CPU 21. The CPU 21 runs a control program stored in the ROM 24 to control the whole wireless terminal device, processes commands and data both input from the operating unit 27 via the I/O 22 and data acquired from the baseband processor 17, and temporarily stores such data in the RAM 23. Moreover, the CPU 21 displays commands and data both stored as needed on the display unit 26 comprising an LCD (Liquid Crystal Display) or the like. Moreover, the ROM 24 stores, in preparation for a case in which another repeater breaks down, information for specifying a repeater for which the own repeater performs the operation to substitute a home repeater, a slot number to which the that repeater outputs information, information on a wireless terminal device which registers that repeater as the home repeater, etc. Furthermore, the CPU 21 displays a current time acquired from the clock unit 25 on the display unit 26. The clock unit 25 counts an elapsed time after a downlink signal is received from a home repeater. When receiving the downlink signal from the home repeater, the CPU 21 resets the elapsed time being clocked by the clock unit 25. Note that the controller 20 may employ a structure such that a rewritable nonvolatile memory card like a flash memory which records identification information unique to a wireless terminal device is detachably attached.

Next, with respect to the blocks for the signaling system, the transmission/reception switching unit 11 has an input end connected to the antenna ANTSR, and has an output end alternatively connected to the transmitting unit 12 or to the receiving unit 16 under the control of the CPU 21. When no transmission operation is made through the operating unit 27, the own wireless terminal device is in a receiving (standby) mode, and the output end of the transmission/reception switching unit 11 is connected to the receiving unit 16. Conversely, when a transmission operation is made through the operating unit 27, the own wireless terminal device becomes a transmitting mode, and the output end of the transmission/reception switching unit 11 is connected to the transmitting unit 12.

When each of the wireless terminal devices TA to TH is in the transmitting mode, the microphone 15 outputs an analog voice signal in accordance with a voice input given by a user to the A/D converter 14.

The A/D converter 14 converts the analog voice signal from the microphone 15 into a digital voice signal and outputs it to the baseband processor 13.

The baseband processor 13 generates a communication frame (a baseband signal) in a predetermined format based on the digital voice signal from the A/D converter 14, or based on data stored in the RAM 23 of the controller 20, and outputs the generated communication frame to the transmitting unit 12.

The transmitting unit 12 modulates a carrier wave using the communication frame from the baseband processor 13, and transmits the modulated wave to a repeater currently performing relaying operation via the transmission/reception switching unit 11 and the antenna ANTSR. GMSK (Gaussian filtered Minimum Shift Keying), PSK (Phase Shift Keying), QAM (Quadrature Amplitude Modulation), FSK (Frequency Shift Keying), etc., is applied to the modulation scheme of the transmitting unit 12.

When each of the wireless terminal devices TA to TH is in the receiving mode, the transmission/reception switching unit 11 connects the antenna ANTSR and the receiving unit 16 together. The receiving unit 16 receives radio signals from respective repeaters $111_1$ to $111_n$ via the antenna ANTSR. The receiving unit 16 amplifies the received signal, performs a signal process like a demodulation process on the received signal, and outputs the processed signal to the baseband processor 17.

The baseband processor 17 extracts a communication frame from the demodulated signal output by the receiving unit 16. Moreover, the baseband processor 17 outputs information on a header part H of the extracted communication frame to the CPU 21. The CPU 21 analyzes the information on the header part H, and when the transmission destination of the received signal is an own station, causes the D/A converter 18 to output data of an audio signal included in a data part D, temporarily stores data other than the voice signal included in the data part D in the RAM 23, and displays such data as needed on the display unit 26. The D/A converter 18 converts the voice signal by the baseband processor 17 from the digital voice signal into an analog voice signal, and outputs it to the speaker 19, and the speaker 19 outputs the analog voice signal as a voice output.

As shown in FIG. 3, as blocks for a signaling system, the repeaters $111_1$ to $111_n$ each includes an antenna ANTS for transmission only, a transmitting unit 32, a baseband processor 33, an antenna ANTR for reception only, a receiving unit 36, a baseband processor 37, an input unit 6, an output unit 7, and a network I/F (interface) 8. Moreover, as blocks for a control system, each repeater includes a controller 40, a clock unit 45, a display unit 46, and an operating unit 47. Furthermore, the controller 40 has a CPU (central processing unit) 41, an I/O (input/output unit) 42, a RAM (random access memory) 43, a ROM (read-only memory) 44, and an internal bus (not illustrated) which connects those together. Moreover, the ROM 44 stores an operation program in a case in which another repeater breaks down together with the normal operation of the CPU 41. Furthermore, the ROM 44 stores, in preparation for the case in which another repeater breaks down, information for specifying a repeater for functions as a home repeater acts for another repeater which is broken, a slot number to which said broken repeater outputs information, information on a wireless terminal device which registers that repeater as the home repeater, etc.

Moreover, the repeaters $111_1$ to $111_n$ each includes a bus I/F (interface) 9 for transmitting information on the own repeater to the system bus 115 to be discussed later and for acquiring information from another repeater.

As the repeaters $111_1$ to $111_n$ (e.g., the repeater $111_1$) each performs signal processes, such as an amplification process and a waveform process, on a radio signal received from a departure wireless terminal device (e.g., the wireless terminal device TA) and transmits such processed radio signal to a destination wireless terminal device (e.g., the wireless terminal device TB), each of those repeaters basically has the same configuration as that of each of the wireless terminal devices TA to TH shown in FIG. 2. Consequently, structural elements which are basically same as those of the wireless terminal devices TA to TH shown in FIG. 2 will be denoted by the same reference numerals, and as operations of those structural elements duplicate those of the wireless terminal devices TA to TH, the explanation thereof will be omitted.

When the wireless terminal devices TA to TH communicate with each other via the repeaters $111_1$ to $111_n$, a transmission uplink from the wireless terminal device to the repeater and a transmission downlink from the repeater to the wireless terminal device establish a communication at substantially same time by changing respective frequencies or respective time slots. Consequently, the repeaters $111_1$ to $111_n$ each includes the antenna ANTS for transmission only and the antenna ANTR for reception only. Moreover, as shown in FIG. 1, the plural repeaters $111_1$ to $111_n$ are connected one another via the system bus 115, and are connected to the server 104 via the communication line 116 like the IP connection line.

Under the control of the CPU 41, the input unit 6 inputs data transmitted from the server 104 via the network I/F 8, and supplies such data to the baseband processor 33. Moreover, under the control of the CPU 41, the output unit 7 outputs data supplied from the baseband processor 37 to the server 104 via the network I/F 8. Furthermore, when a multisite network is built in which a repeater communicates with another repeater in another site configuring a different communication area, the input unit 6 and the output unit 7 exchange a communication frame with another repeater in another site via the network I/F 8. The bus I/F 9 intermediates acquisition of a synchronization signal transmitted to the system bus 115 by a master repeater and of repeater information transmitted to the system bus 115 by repeaters other than the own repeater under the input control of the CPU 41, and transmission of information on the own repeater to the system bus 115 under the output control of the CPU 41.

Figure 5:
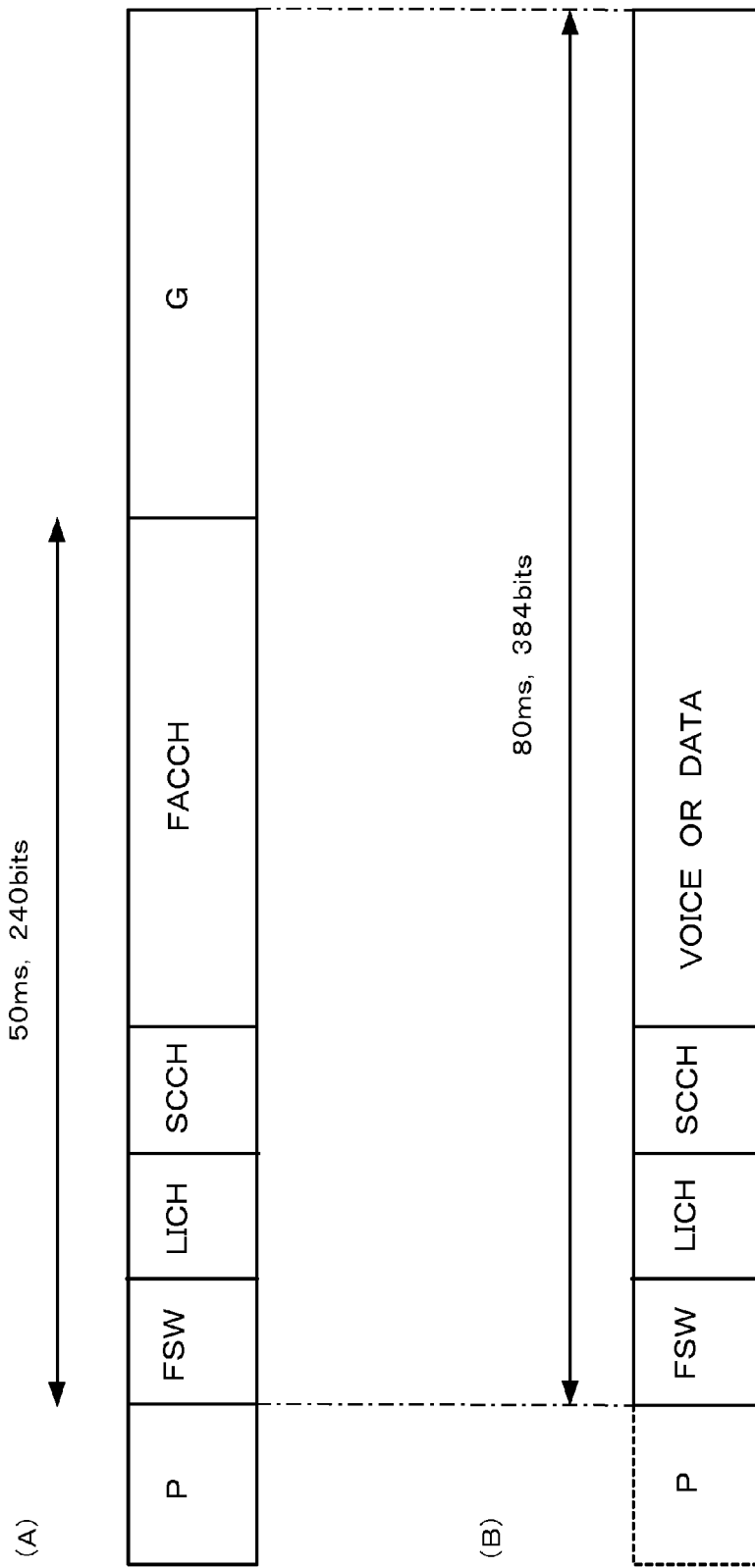
FIG. 5 is a diagram showing a frame format exchanged between the repeater and the wireless terminal device both in FIG. 1.

Next, an explanation will be given of a wireless communication method of the wireless terminal system according to the embodiment with reference to FIG. 4 and FIG. 5.

A synchronization signal in FIG. 4 has a period of 80 ms, and the first half of 40 ms includes thirty-two slots from a slot 0 to a slot 31. Consequently, each slot has a time length of 1.25 ms. The first slot 0 is a synchronization signal, and transmitted by a specific repeater, i.e., the master repeater $111_1$ in accordance with a set algorithm, and the other repeaters $111_2$ to $111_n$ serve as slave repeaters and acquire that synchronization signal. The repeaters $111_1$ to $111_n$, i.e., the repeater system 130 operates in synchronization with the synchronization signal. Any one of the slots from the slot 1 to the slot 31 other than the slot 0 for synchronization is allocated to each of the repeaters $111_1$ to $111_n$. The repeaters $111_1$ to $111_n$ each writes information on each shared repeater in a slot allocated to the own repeater. The repeater $111_1$ which is the master repeater transmits the synchronization signal in the slot 0, and writes information on the repeater $111_1$ (e.g., information indicating whether the repeater $111_1$ is idle or relaying a communication) in a slot allocated to the repeater 1 among the slots from the slot 1 to the slot 31. Note that the last slot 31 is used for connecting external devices for future extensions.

FIG. 5A shows an illustrative format of a communication frame when a link with a communication channel is established, and FIG. 5B shows an illustrative format of a communication frame at the time of voice and data communication. In FIGS. 5A and 5B, the format of each communication frame has a configuration of 80 ms and 384 bits. Moreover, a preamble (P) equal to or larger than 24 bits is affixed to the header of the frame at the time of an initial transmission only. FSW is a frame synchronization word, LICH is a link information channel, SCCH is a signaling information channel for trunking control, and G is a guard time.

Figure 6:
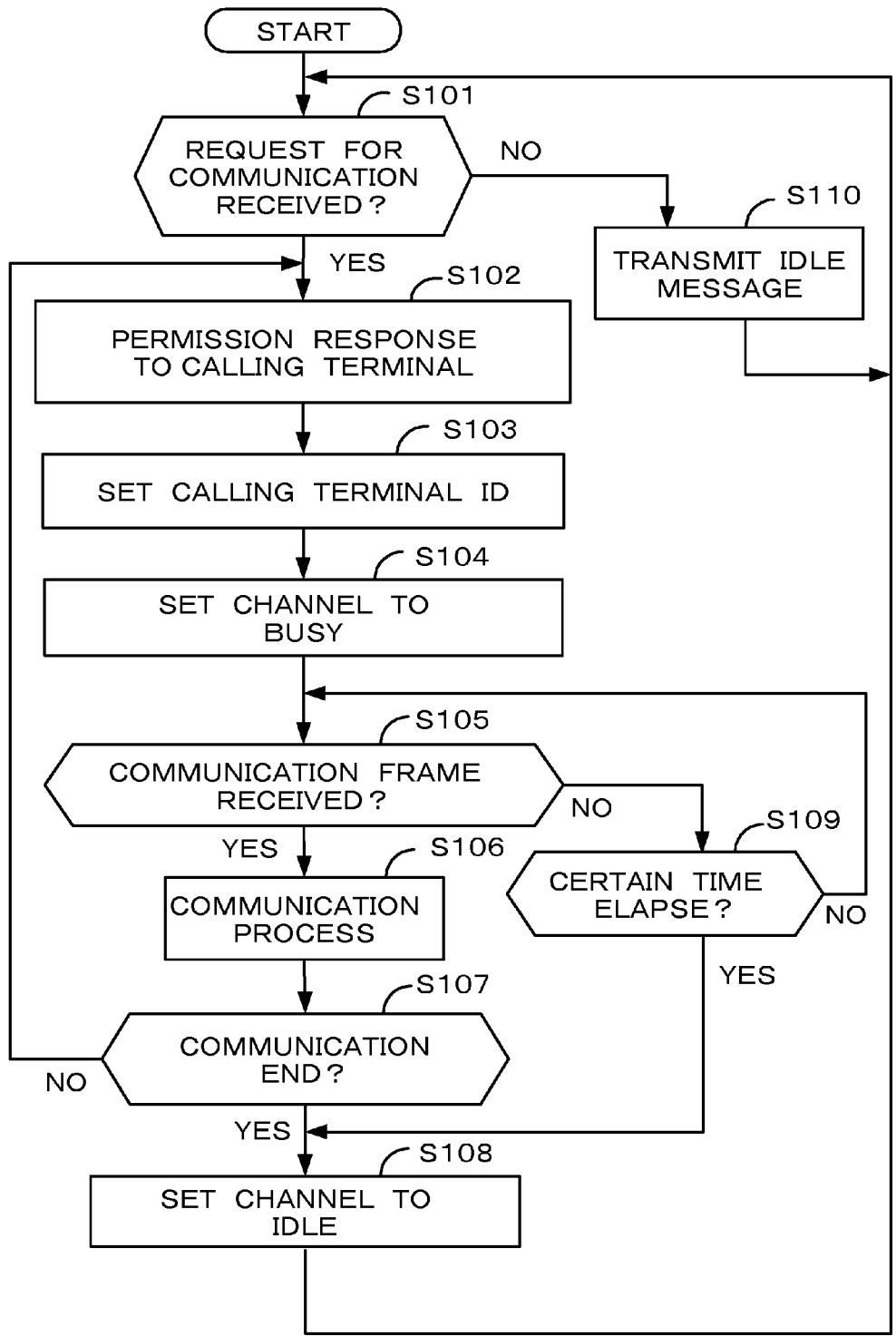
FIG. 6 is a flowchart showing a main routine executed by a CPU of the repeater in FIG. 3.

FIG. 6 is a flowchart showing a main routine executed by the CPU 41 of the repeater in FIG. 3.

When the power is turned on, the CPU 41 starts a process in FIG. 6, and first, determines whether or not a request for communication is received from any one of wireless terminal devices (step S101), and when receiving the request for communication, transmits a response to the effect that the use of a channel is permitted to a calling terminal (step S102).

Moreover, the CPU 41 stores the ID of the caller terminal, i.e., terminal identification information, the ID of a called wireless terminal device (hereinafter, referred to as a "called terminal"), the ID of a home repeater which registers the calling terminal and the called terminal, etc., are stored in the RAM 43 from the communication frame of a received call (step S103), and channel information is changed and set from an idle state to a busy state (step S104). As will be discussed later, the information stored in the RAM 43 in the step S103 is transmitted by the controller unit to another repeater via the system bus.

Thereafter, when a communication frame for communication is received from the caller terminal (step S101; Yes), and when the communication frame is received during a certain receiving standby time, necessary information like idle-channel information is affixed to the communication frame and a communication process of relaying the communication frame between the caller terminal and the called terminal is executed (step S106). Thereafter, it is determined whether or not the communication has ended (step S107), and when the communication has ended and when no communication frame is received in the step S109 even after a certain time has elapsed, the channel information is changed and set from the busy state to the idle state (step S108). When there is a response from the called terminal to the caller terminal, the called terminal requests a communication to the repeater $111_2$, so that the above-explained operation is repeated. Note that when a calling for a group communication in a group to which a wireless terminal device currently in communication belongs is made, the ID of the group communication, a channel where the group communication is performed, a repeater ID of a home repeater which registers a wireless terminal device belonging to the ID of the group communication are affixed to a communication frame in the communication process at the step S106. As will be discussed later, the affixed information is checked by a wireless terminal device which has received a communication frame for relaying, and the wireless terminal device shifts a communication channel as needed so as to participate the group communication.

As explained above, each repeater 111 can recognize whether or not another channel is in a busy (including a link establishing state) or idle state by acquiring information written by another repeater in a SLOT allocated thereto. Consequently, when no request for communication is received in the step S101, the communication frame of a downlink signal including an Idle message which is information on a repeater that is an idle channel is transmitted (step S110). Consequently, the wireless terminal device can call to a channel in an unused state as a communication channel based on channel information received from the home repeater. At this time, the ID of the group communication, the communication channel, the repeater ID of the home repeater which registers the wireless terminal device belonging to the ID of that group communication can be written in the communication frame for relaying.

Figure 7:
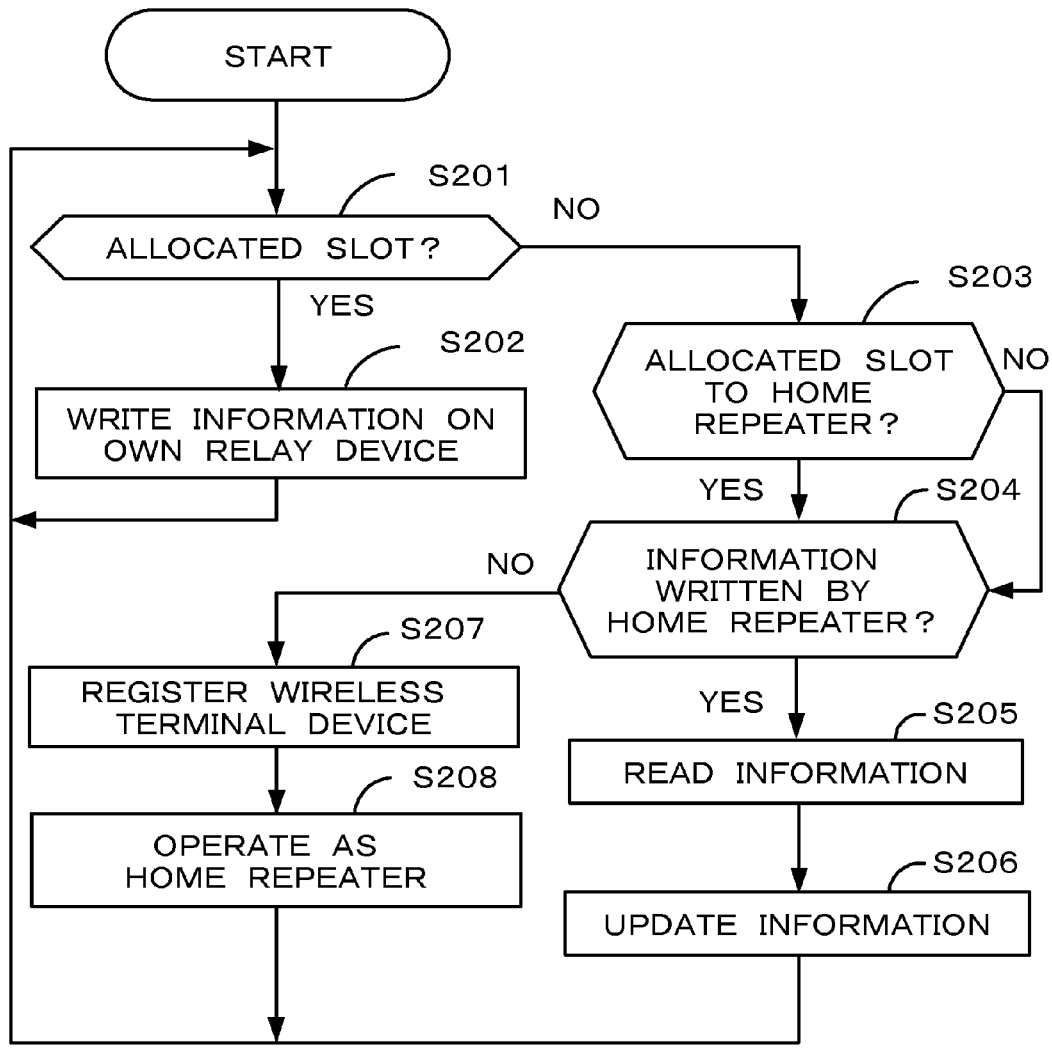
FIG. 7 is a flowchart in a case in which any one repeater among the repeaters 1 to n in FIG. 1 acts as a home repeater for a wireless terminal device which registers another repeater as the home repeater.

FIG. 7 is a flowchart in a case in which any one repeater among the repeaters $111_1$ to $111_n$ in FIG. 1 performs the operation to substitute for a home repeater for a wireless terminal device which registers another repeater as the home repeater. A repeater substituting for a home repeater has information on for which the own repeater performs the operation to substitute for the home repeater and information on a wireless terminal device which registers a repeater subject to the substitution as the home repeater, and such information is set and stored in the ROM 44 in the controller 40 beforehand. Moreover, information on to which slot the repeater subject to the substitution transmits information is also stored in the ROM 44.

The CPU 41 which is set to act as a home repeater executes a process in FIG. 7 in a time-sharing manner in parallel with the process in FIG. 6, and first, determines whether or not a transmission right which follows a synchronization signal and which circulates over the system bus 115 is received, i.e., whether or not a slot to which information is transmitted is a slot allocated to the own repeater from a time clocked by the clock unit 45 (step S201). When it is determined that the slot is the allocated slot to the own repeater (step S201; Yes), information on the own repeater is written in that slot (step S202). Examples of the information to be written are channel information indicating whether the channel of the own repeater is in a busy or idle state, and respective IDs of equal to or more than two wireless terminal devices in communication when that channel is in a busy state.

In the step S201, when it is determined that the transmission right which circulates over the system bus 115 is not received, i.e., when it is determined that the slot to which information is transmitted is not the allocated slot to the own repeater (step S201; No), it is determined whether or not the slot is an allocated slot to a repeater for which the own repeater performs the operation to substitute for a home repeater (step S203). When the slot is the allocated slot to a repeater for which the own repeater performs the operation to substitute for the home repeater, it is determined whether or not information has been written in the slot by the repeater which the own repeater performs the operation to substitute for the home repeater (step S204).

When the information has been written by a repeater for which the own repeater performs the operation to substitute for the home repeater, this indicates that the home repeater performs the operation to substitute the own repeater instead operates normally. In this case, the written information is read (step S205). Thereafter, information stored in the RAM 43 is updated (step S206).

Conversely, in the step S203, when the slot is not the allocated slot to a repeater for which the own repeater performs the operation to substitute for the home repeater, but is an allocated slot to the other repeater other than the own repeater and a repeater for which the own repeater performs the operation to substitute for the home repeater, information written by the other repeater is read (step S205), and the information stored in the RAM 43 is updated (step S206).

In the step S204, when no information is written in the allocated slot to a repeater for which the own repeater performs the operation to substitute for the home repeater this indicates that a circumstances stopping the operation of the home repeater performs the operation to substitute the own repeater occurs. Examples of the circumstances stopping the operation are the breakdown of the repeater, a maintenance, and other situations. In this case, the ID of a wireless terminal device which registers a repeater for which the own repeater performs the operation to substitute for the home repeater as a home repeater is registered in the own repeater (step S207), and the own repeater operates as the home repeater for the wireless terminal device (step S208).

For example, the repeater $111_2$ is set to perform the operation to substitute the repeater $111_1$ instead to perform the function of the repeater $111_1$ as a home repeater. The CPU 41 of the repeater $111_2$ checks whether or not the repeater $111_1$ writes information in the slot 1 allocated to the repeater $111_1$ (steps S203, S204), and when the repeater $111_1$ writes no information (step S204; No), the CPU 41 of the repeater $111_2$ operates as the home repeater for the wireless terminal devices TA to TD which register the repeater $111_1$ as the home repeater (steps S207, S208). Consequently, following to this operation, the repeater $111_2$ operates as the home repeater for the wireless terminal devices TA to TF.

Figure 8:
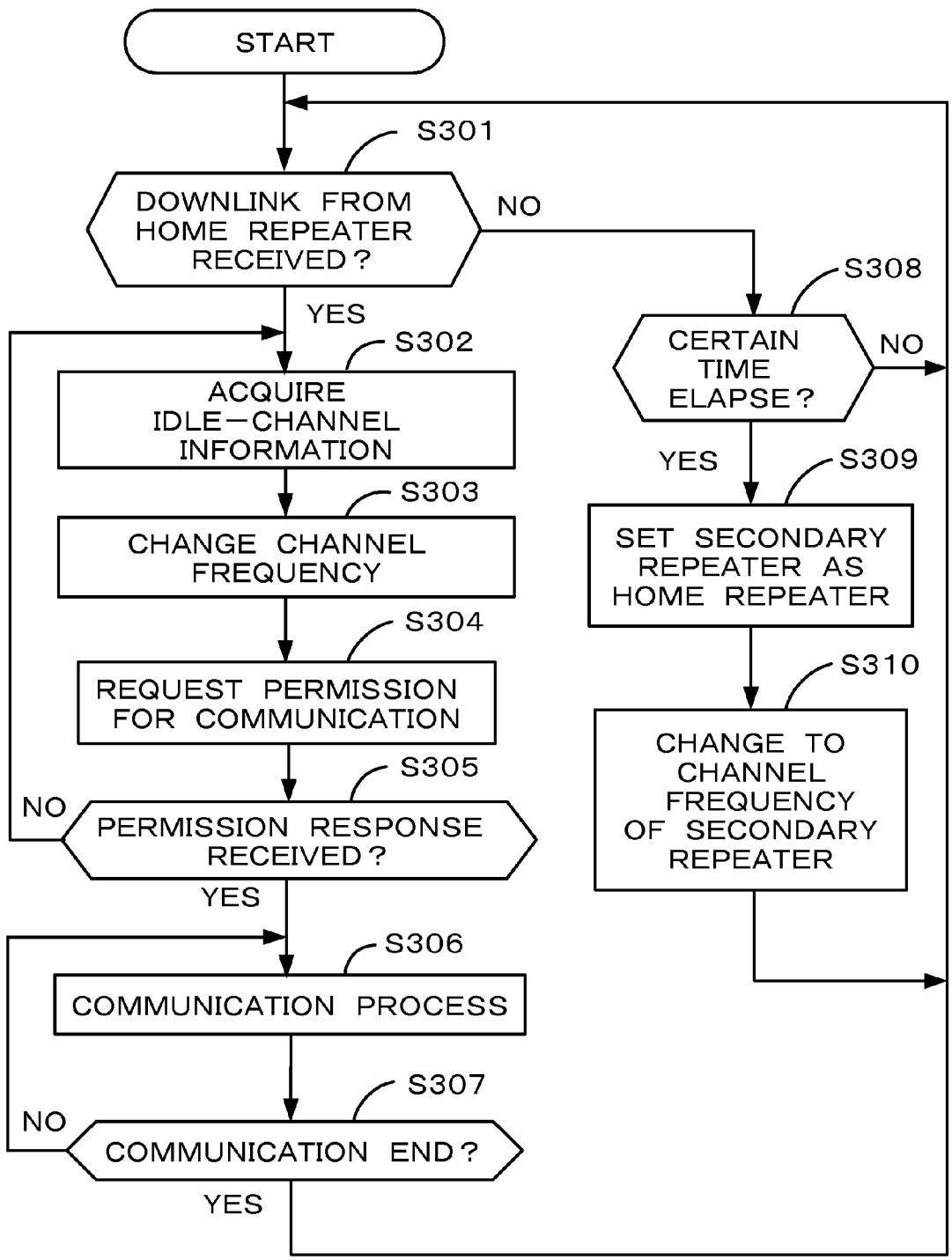
FIG. 8 is a flowchart showing a main routine executed by a CPU of the wireless terminal device in FIG. 2.

FIG. 8 is a flowchart showing an operation of the wireless terminal device. The wireless terminal devices TA to TH each has a channel frequency set to be the channel frequency of a home repeater in a standby mode. When the repeaters $111_1$ to $111_n$ each receives, as a communication channel, a communication frame requesting each repeater to permit communication, the repeater transmits a response to the effect that a communication is permitted by a downlink signal, transmits a communication frame for relaying by a downlink signal if it is after transmission of the response to the effect that the communication is permitted, and is transmitting an Idle message at a regular interval by a downlink signal when not operating as the communication channel. Each of the wireless terminal devices TA to TH is registered in any one of the repeaters $111_1$ to $111_n$ as a home repeater beforehand, and has a channel frequency set to be the channel frequency of the home repeater in the standby mode. That is, those wireless terminal devices each receives each downlink signal transmitted from the home repeater. Moreover, another repeater which performs the operation to substitute the home repeater (hereinafter, a secondary repeater) instead when a circumstances stopping the operation of the home repeater occurs, and the channel frequency of another repeater are also registered beforehand.

A wireless terminal device determines, when attempting to communicate with another wireless terminal device, whether or not a downlink signal is received from a home repeater (step S301), and acquires idle-channel information included in the downlink signal from the home repeater (step S302). When the acquired idle-channel information indicates the channel of a repeater other than the home repeater, a channel frequency is changed (step S303).

Next, the wireless terminal device requests a repeater in an idle state to permit a communication based on the acquired idle-channel information (step S304), and determines whether or not a response to the effect that a communication is permitted is received from that repeater (step S305). When no response to the effect that a communication is permitted is received, the process is transitioned to the step S302 and idle-channel information on another repeater is acquired, and a process loop up to the step S305 is repeated.

When a response to the effect that a communication is permitted is received from any one of the repeaters, the communication is performed with that repeater (step S306). Thereafter, it is determined whether or not the communication has ended (step S307). When the communication has ended, it is determined whether or not the communication was with the home repeater, and when the communication was with a repeater other than the home repeater, the frequency of the own channel is changed to the channel frequency of the home repeater. Subsequently, the wireless terminal device transitions a control to the step S301, and waits for the reception of a downlink signal from the home repeater.

In the step S301, when no downlink signal is received from the home repeater, it is determined whether or not a certain time has elapsed (step S308). As explained above, as the home repeater is transmitting the Idle message at a regular interval by a downlink signal when not operating as the communication channel, it is appropriate if a time acquired by adding a predetermined margin to a transmission interval of the Idle message is set as a certain elapse time for standby.

When no downlink signal is received from the home repeater even after the certain time has elapsed, it means a circumstances stopping the operation of the home repeater occurs. In this case, a secondary repeater which is registered beforehand is set as the home repeater (step S309), and the channel frequency is changed to the channel frequency of the secondary repeater (step S310). Thereafter, the wireless terminal device transitions the process to the step S301, and waits for the reception of a downlink signal from the newly set home repeater.

After the request for communication permission is transmitted to the home repeater, when no response to the effect that a communication is permitted is received from the home repeater even after a predetermined time set beforehand has elapsed, it also means a circumstances stopping the operation of the home repeater occurs. In this case, a configuration may be also employed in which the secondary repeater is set as the home repeater and the channel frequency is changed to the channel frequency of the secondary repeater.

In the foregoing example, the wireless terminal devices TA to TD register the repeater $111_1$ as a home repeater, and register the repeater $111_2$ as a secondary repeater. When the repeater $111_1$ becomes inoperative, the repeater $111_1$ is disabled to transmit a downlink signal. Accordingly, the wireless terminal devices TA to TD determine in the step S308 that the certain time has elapsed. Thereafter, the wireless terminal devices TA to TD each sets a transmission frequency and a reception frequency to be the channel frequency of the secondary repeater $111_2$ (steps S309, S310).

As explained above, in the foregoing embodiment, the wireless terminal devices TA to TH each registers any one repeater among the plural repeaters $111_1$ to $111_n$ beforehand as a home repeater, and also registers another repeater beforehand as a secondary repeater. When stopping the operation of the home repeater, the secondary repeater operates as the home repeater for a wireless terminal device which registers the disabled repeater as the home repeater. In this case, the secondary repeater transmits control information to the wireless terminal device which registers the defective repeater as the home repeater.

For example, a secondary repeater determines that a repeater subjected to acting instead breaks down when a signal which is regularly transmitted to the system bus 115 from that repeater cannot be received. Moreover, a wireless terminal device determines that a home repeater breaks down when, for example, no downlink signal comes from the home repeater.

The wireless terminal devices TA to TH each stores the ID of a home repeater and that of a secondary repeater in memory means like the ROM 24 beforehand. The wireless terminal devices TA to TH each has a function of taking a secondary repeater as a home repeater based on the ID stored in a memory unit like the ROM 24 when stopping the operation of a home repeater.

Consequently, according to the foregoing embodiment, in a distributed wireless communication system, when stopping the operation of a repeater which is registered as a home repeater (e.g., the repeater $111_1$), a secondary repeater (e.g., the repeater $111_2$) can act instead as that repeater to perform operation as the home repeater.

Moreover, each repeater inserts, while acting as another repeater instead to perform operation as a home repeater, the ID of the own repeater and the ID of the repaeter subject to the substitution in the communication frame of, for example, an Idle message and transmits such communication frame. In this fashion, each repeater can indicate the wireless terminal devices TA to TH that the own repeater is currently acting as another repeater instead.

The secondary repeater acquires information on another repeater transmitted to the system bus 115 as shown in the flowchart of FIG. 7. When a repeater substituted by the own repeater as a home repeater instead is recovered (is restored to a normal operating condition), the own repeater can detect that the defective repeater is recovered based on a condition in which information is transmitted to an allocated slot.

When detecting that a repeater for which individual repeater performs the operation to substitute a home repeater instead is recovered, each repeater changes a repeater ID inserted in the communication frame of an Idle message to the ID of the own repeater or to a different code indicating a state in which no acting operation is performed, and transmits the communication frame. This enables each repeater to indicate a wireless terminal device that an original home repeater is recovered.

The wireless terminal device analyzes the communication frame from the secondary repeater, and when detecting that a repeater which is originally registered as a home repeater is recovered, returns the home repeater from the secondary repeater to the original home repeater which is recovered.

Note that the foregoing embodiment is provided to give explanations of the present invention, the present invention is not limited to the foregoing embodiment, and other embodiments and modified examples which can be though out by those skilled in the art are also included in the present invention without departing from the scope and the spirit of the present invention.

Moreover, in the foregoing embodiment, a first relay device corresponds to the home repeater, and a second relay device corresponds to the secondary repeater. However, for example, the first relay device may serve as the function of the secondary repeater and the second relay device may serve as the function of the home repeater. In short, it is appropriate if either one of the two repeaters bears the role as the home repeater and another one bears the role as the secondary repeater in accordance with a communication situation at a given time.

$111_1$ to $111_n$ Repeater
TA to TH Wireless terminal device
115 System bus (communication line)

The invention claimed is:

1. A wireless communication system comprising:
a plurality of relay devices which are connected to one another via a communication line and to which unique relaying channels are respectively allocated; and
a plurality of wireless terminal devices which communicate with each other via at least one of the plurality of relay devices,
each relay device of the plurality of relay devices transmitting control information to each wireless terminal device which is registered in the corresponding relay device, and
each wireless terminal device selecting, based on the control information received from the relay device which registers the corresponding wireless terminal device, a channel that is currently able to relay a communication among channels allocated to the respective relay devices to establish a communication between the wireless terminal devices, wherein a second relay device of the plurality of relay devices has information on the wireless terminal device registered in a first relay device of the plurality of relay devices beforehand, and the wireless terminal device registered in the first relay device has information on the second relay device beforehand, and further wherein
when the first relay device becomes unable to transmit the control information, the second relay device transmits, instead of the first relay device, the control information to the wireless terminal device registered in the first relay device, and
the wireless terminal device registered in the first relay device receives the control information from the second relay device.

2. The wireless communication system according to claim 1, wherein when being unable to receive a signal regularly transmitted from the first relay device via the communication line even after a predetermined period has elapsed, the second relay device transmits, instead of the first relay device, the control information to the wireless terminal device registered in the first relay device.

3. The wireless communication system according to claim 1, wherein when being unable to receive control information from the first relay device even after a predetermined period has elapsed, the wireless terminal device registered in the first relay device receives the control information from the second relay device.

4. A wireless communication method of a wireless communication system comprising a plurality of relay devices which are connected to one another via a communication line and to which unique relaying channels are respectively allocated, and a plurality of wireless terminal devices which communicate with each other via at least one of the plurality of relay devices, each relay device of the plurality of relay devices transmitting control information to each wireless terminal device registered in the corresponding relay device, and each wireless terminal device selecting, based on the control information received from the relay device which registers the corresponding wireless terminal device, a channel that is currently able to relay a communication among channels allocated to the respective relay devices to establish a communication between the wireless terminal devices, wherein a second relay device of the plurality of relay devices has information on the wireless terminal device registered in a first relay device of the plurality of relay devices beforehand, and the wireless terminal device registered in the first relay device has information on the second relay device beforehand, and further wherein when the first relay device becomes unable to transmit the control information, the second relay device transmits, instead of the first relay device, the control information to the wireless terminal device registered in the first relay device, and the wireless terminal device registered in the first relay device receives the control information from the second relay device.

* * * * *